(12) United States Patent
Rollwa (10) Patent No.: US 10,513,401 B2
(45) Date of Patent: Dec. 24, 2019

(54) METHOD AND DEVICE FOR CHANGING THE ALIGNMENT OF ARTICLES IN A CONVEYING FLOW

(71) Applicant: Dematic GmbH, Heusenstamm (DE)

(72) Inventor: Volker Dieter Rollwa, Pirmasens (DE)

(73) Assignee: Dematic GmbH, Heusenstamm (DE)

( * ) Notice: Subject to any disclaimer, the term of this patent is extended or adjusted under 35 U.S.C. 154(b) by 182 days.

(21) Appl. No.: 15/564,446

(22) PCT Filed: Apr. 7, 2016

(86) PCT No.: PCT/EP2016/057667
§ 371 (c)(1),
(2) Date: Oct. 5, 2017

(87) PCT Pub. No.: WO2016/162444
PCT Pub. Date: Oct. 13, 2016

(65) Prior Publication Data
US 2018/0072510 A1    Mar. 15, 2018

(30) Foreign Application Priority Data
Apr. 8, 2015  (DE) .................. 10 2015 105 317

(51) Int. Cl.
*B65G 47/244*   (2006.01)
*B65G 43/08*    (2006.01)

(52) U.S. Cl.
CPC ........... *B65G 47/244* (2013.01); *B65G 43/08* (2013.01); *B65G 2201/02* (2013.01);
(Continued)

(58) Field of Classification Search
CPC .......... B65G 47/244; B65G 2203/0225; B65G 2201/02
(Continued)

(56) References Cited

U.S. PATENT DOCUMENTS 2,190,418 A * 2/1940 Davidson ............. B65G 47/244
                                                 198/416
3,128,868 A   4/1964 Bowen
(Continued)

FOREIGN PATENT DOCUMENTS

DE   3524339 A1   1/1987
DE   3832408 C1   3/1990
(Continued)

OTHER PUBLICATIONS

International Search Report and Written Opinion of the International Searching Authority from corresponding Patent Cooperation Treaty (PCT) Application No. PCT/EP2016/057667, indicated completed on Jun. 20, 2016.
(Continued)

*Primary Examiner* — William R Harp
(74) *Attorney, Agent, or Firm* — Gardner, Linn, Burkhart & Ondersma LLP (57) ABSTRACT

A method for changing the alignment of articles in a conveying flow, wherein, by a rotary projection projecting into the conveying path of a conveyor of a material handling system, the alignment of the article is achieved via the force of the conveying flow, and the conveying flow runs obliquely in front of the rotary projection in relation to the direction thereof, in order to ensure the contacting of the article on the rotary projection. The rotary projection is configured such that it can move in a transverse manner in relation to the conveying flow, in such a way that the extension thereof into the conveying flow is variable, wherein the scale of the extension of the rotary projection into the conveying flow is determined based on the respective article.

20 Claims, 5 Drawing Sheets

(52) U.S. Cl.
 CPC ............... *B65G 2203/0225* (2013.01); *B65G 2203/041* (2013.01); *B65G 2203/044* (2013.01); *B65G 2811/0626* (2013.01)

(58) Field of Classification Search
 USPC .............................................. 198/395, 416
 See application file for complete search history.

(56) References Cited

U.S. PATENT DOCUMENTS

| | | | |
|---|---|---|---|
| 3,269,513 | A | 4/1966 | Del Rosso |
| 3,834,516 | A | 9/1974 | Reeser |
| 3,954,190 | A | 5/1976 | Howard et al. |
| 3,958,688 | A * | 5/1976 | Sterling ................. B65B 35/56 198/416 |
| 4,930,615 | A * | 6/1990 | Nash ..................... B65G 47/244 198/411 |
| 5,188,211 | A * | 2/1993 | Ringot .................. B65G 47/244 198/411 |
| 5,310,041 | A | 5/1994 | Draghetti |
| 5,844,807 | A | 12/1998 | Anderson et al. |
| 7,036,655 | B2 | 5/2006 | Schafer |
| 7,111,722 | B2 * | 9/2006 | Burch ..................... B65G 17/24 198/411 |
| 7,931,137 | B2 | 4/2011 | Wargo |
| 2004/0134753 | A1 * | 7/2004 | Diego .................. B65G 47/244 198/395 |
| 2010/0300836 | A1 * | 12/2010 | Fourney ................. B65G 17/24 198/416 |

FOREIGN PATENT DOCUMENTS

| | | |
|---|---|---|
| DE | 9210809 U1 | 10/1992 |
| DE | 202004011629 U1 | 12/2005 |
| EP | 0582963 A1 | 2/1994 |
| FR | 2622556 A1 | 5/1989 |
| GB | 2095194 A | 9/1982 |
| JP | S57145717 A | 9/1982 |
| JP | 2976279 B2 | 7/1998 |
| JP | 2976278 B2 | 11/1999 |

OTHER PUBLICATIONS

Preliminary Report on Patentability of the International Searching Authority in English from corresponding Patent Cooperation Treaty (PCT) Application No. PCT/EP2016/057667, completed Oct. 10, 2017.

* cited by examiner

METHOD AND DEVICE FOR CHANGING THE ALIGNMENT OF ARTICLES IN A CONVEYING FLOW

CROSS REFERENCE TO RELATED APPLICATIONS

The present application claims the priority benefits of International Patent Application No. PCT/EP2016/057667, filed Apr. 7, 2016, and claims benefit of DE 10 2015 105 317.9, filed on Apr. 8, 2015.

BACKGROUND OF THE INVENTION

The invention relates to a method and a device for changing the orientation of articles in a conveying flow, wherein by means of a rotary projection protruding into the conveying path of the conveyor the orientation of the articles is achieved by the force of the conveying flow and the conveying flow runs in a skewed manner upstream of the rotary projection in the direction thereof in order to ensure that the articles contact the rotary projection.

It is generally known that for automatic handling of articles in material handling installations and warehouses etc. it is necessary to provide the articles in a defined orientation. For this purpose, it is often necessary to change the orientation of the articles.

DE 35 24 339 A1 discloses changing the orientation of bags on a belt conveyor by means of a bag deflector protruding into the conveying path of the belt conveyor.

U.S. Pat. No. 5,844,807 (cf. FIG. 18) likewise discloses changing the orientation of articles on a roller conveyor according to the same principle, wherein the rollers of the roller conveyor are skewed in order to effect contact of the articles with the side wall of the conveyor.

DE 92 10 809 U1 discloses a device for changing the location of items on endless conveyors in which a transverse stop can be brought into the conveying region. For this purpose, the transverse stop is movable into a single fixed end position—analogous to DE 35 24 339 A1—in which the transverse stop always protrudes by the same distance into the conveying region. In a similar design, DE 20 2004 011 629 U1 discloses a turnstile which can be retracted into and extended from the conveying path.

SUMMARY OF THE INVENTION

The object of the invention includes providing an improved alternative method and device for changing the orientation of articles in a conveying flow which can be used in particular with a wide range of widely differing articles in order to change the orientation thereof if required, and further includes simultaneously separating grouped articles.

In accordance with the invention it has become known that when the rotary projection is designed so as to be movable transversely with respect to the conveying flow such that its extension into the conveying flow is variable, wherein the length of the extension of the rotary projection into the conveying flow is set according to the respective article, it is possible to influence the orientation per se and the degree thereof in a controlled manner in dependence upon the article. It is preferred to achieve a rotation of the articles by 90 degrees.

In other words, the position of the rotary projection (retraction position and maximum extension position) can be defined in an article-dependent manner. For the respective article/package this can be based on tests or available data or experiments from which the required position of the rotary projection was determined.

Criteria for determining the position of the rotary projection in order to effect the desired change in the orientation of articles in a conveying flow are e.g.:

The orientation of the article (or of the packaging unit or container) on the conveyor. This can be detected—optionally by means of the outer shape—in advance by means of a location detecting system e.g. camera, laser scanner, light grid etc.;

The centre of gravity of the article from previously determined or known values which are stored in a control system so that the position of the rotary projection is automatically adapted on the basis thereof;

The material frictional coefficient of the articles; and

The conveying speed.

Of course, articles can be understood to be the whole range of articles found in a warehouse, such as individual articles or packaging units (packages) with regular or irregular shapes, different weights and surfaces. In the present case, only articles are mentioned for simplicity.

The information and/or criteria for determining the position of the rotary projection for the articles may possibly already be stored as the articles are being received into the warehouse or in the system. Alternatively, this can also take place only upon discharge onto the conveying mechanism. In both cases, the criteria for determining the position of the rotary projection can be determined according to a "teach in" process. The location detecting system then does not serve to detect but only to check the location and possibly correct the necessary positioning of the rotary projection.

As one of many possible embodiments it is possible to use e.g. a light grid to detect the height and the width and/or light grids to generate a start signal for measurement of the length via incremental encoders.

Another possibility for detecting the location or the article is the use of a camera system.

When and where specific articles are located in the warehouse or on the conveying mechanism is retained in the corresponding management software so that e.g. the sequence thereof is known or preset.

The rotary projection thus occupies a variable extension position between zero (retracted) and maximum (extended) depending on the values for the respective article which are determined e.g. in the "teach in".

The completely retracted, zero, position is used for articles which must not be rotated or changed in their orientation. This can be the case when they have e.g. a cylindrical cross-section or are already correctly orientated.

In accordance with an aspect of the invention, the length of the extension of the rotary projection into the conveying flow is set according to the respective article.

It is important that the change in the orientation is effected without lifting or shaking etc. and therefore does not influence the conveying flow nor damage articles.

In order that the articles, when necessary, also reliably impact the rotary projection, it is useful if the angle of the skewed conveying flow increases gently going towards the rotary projection and then gently decreases. Therefore, in addition to the reliable contact against the rotary projection, gentle, protective handling of the articles is also achieved.

As already mentioned, by means of a location detecting system, i.e. in an upstream measuring section, the orientation of the articles can be determined in order to make corrections if necessary.

The invention also relates to a corresponding device for changing the orientation of articles on a conveyor, in particular a roller conveyor, with a rotary projection protruding into the conveying path of a conveyor of a material handling installation, which rotary projection changes the orientation of the articles by the force of the conveying flow upon contact, wherein the conveyor conveys upstream of the rotary projection in a skewed manner in the direction thereof in order to ensure that the articles contact the rotary projection, and wherein the rotary projection is designed to be movable transversely with respect to the conveying path in such a way that its extension into the conveying flow can be controlled in a variable manner depending on the respective article.

In other words, in the case of the device, the extension position of the rotary projection is adjusted in dependence upon the individual item being conveyed, in order to achieve the desired change in orientation (or no change).

The extension position is previously determined e.g. by means of tests on the articles or is stored in the controller of the installation or of the device on the basis of available empirical values (cf. above).

In the retracted position, the orientation of the articles is not changed. Thus articles which are already correctly orientated can pass the device without being influenced. In the completely retracted position, the rotary projection does not protrude into the conveyor but is retracted through the side wall thereof (cf. below).

The rotary projection is preferably constructed in a comb-like manner from at least two flexible damping blades which are rounded at the tip and are spaced apart one above the other and with respect to each other. Therefore, a number of advantages can be achieved at the same time.

The comb design makes it possible to retract and extend the rotary projection through "slits" in the side wall/guide of the conveyor and in so doing to provide the side wall with only small openings so that articles do not get stuck on the side wall, in particular if they are small, since no larger openings are necessary. It can thus also be ensured that the side wall still retains its guiding function and comprises no gaps when the rotary projection is in the retracted position. The side wall itself comprises small vertically disposed rollers so that article contact does not lead to a braking effect.

The flexible damping blades permit gentle handling of the conveyed items by means of a damping effect and the design and material of the comb.

The blades of the comb can be made of e.g. synthetic material such as polyamide or metal such as steel or aluminium which are provided with polyurethane synthetic material belts e.g. for direct contact damping.

In addition, the damping can be effected by means of shock-absorbers, elements etc. made of rubber, polyurethane etc. which permit the rotary projection to flex in the conveying direction. The flexibility can also be changed/adjusted in a controlled manner depending on the damping element and to suit the respective article, analogously to the extension position so that upon contact with the projection in the conveying direction this has a shock-absorbing effect on the articles. The controlled adjustment can be based on test and empirical values previously determined and stored in the computer.

The head of the rotary projection or of the blades can be provided with an increased frictional coefficient locally in the contacting region, e.g. by means of an appropriate coating.

By means of an actuator, the rotary projection can be displaced linearly in a continuously variable manner between a position extended out of the conveying path and a position retracted into the conveying path. The actuator can be an electric actuator such as e.g. a linearly acting linear electric drive, electric motor with a gear rod, eccentric adjustment drive etc. but also a hydraulic or pneumatic cylinder.

The damper can be disposed between the actuator or the drive and the head of the rotary projection (cf. above). It is also possible to dispose the entire rotary projection assembly including the drive on a carriage which is damped in the conveying direction.

When the rollers are skewed at an increasing angle going towards the rotary projection and are skewed with respect to the normal conveying direction at a decreasing angle going away from the rotary projection, the articles also—when necessary—reliably contact the rotary projection and gentle protective handling of the articles is also achieved.

The roller axes upstream of the rotary projection are preferably changed continuously from 0 to 9 degrees (skewed in comparison to the normal conveying direction in which they are transverse thereto) and downstream of the projection the rollers are then constantly at the 9 degree angle as far as the end of the orientation section in order then to be reduced in reverse continuously to 0 degrees.

In order to avoid the article being turned beyond the desired orientation the rotary angle is determined and adjusted to be preferably smaller than the complete rotational angle or the rotational angle ultimately to be achieved (change in orientation) since the desired complete rotation as far as the complete change in orientation of the article is fully effected through the further transportation by means of the skewed rollers until running onto the lateral guide.

A measuring section with an apparatus for recognising the orientation and dimensions of the articles can be disposed upstream of the skewed conveying section and can determine the location of the articles in order to carry out corrections if necessary (cf. above).

The area of application of the invention is in any automated material handling installations in which automatic handling is dependent on the precise orientation of the articles. In particular, these are automatic devices for palletising purposes. In these cases, the invention can be used in supply sections.

The invention can also be used to separate grouped articles on the conveyor, i.e. to split up articles conveyed next to one another, in which one of the articles is contacted by the rotary projection and the other is conveyed further without being influenced.

All in all it is possible with the invention to dispose and orientate the articles on the conveying section in a defined manner so that automatic further handling is simplified.

Further features and details of the invention will be apparent from the following description of the drawings.

DESCRIPTION OF THE PREFERRED EMBODIMENTS

The figures illustrate a supply section—designated as a whole by 1—to an (or a plurality of) automatic device(s) used for palletising (not shown) having a conveying direction F for the supply of articles P and orientation thereof.

The supply section 1 comprises a first conveying section 2 and a second adjoining conveying section 3.

The first conveying section 2 comprises two successive belt conveyors 4, 5 with side guide plates 7. In the region of the transition from the belt conveyor 4 to the belt conveyor 5 a measuring bridge 6 is installed below which the articles P travel through and in so doing are measured with respect to their orientation, size and shape and their grouping etc. by a location detection system 11 in the form of a laser scanner This location detection can be used both to check the article stored in the computer and possibly for correction purposes in the case of incorrect data and also for the direct determination of the article data including the positioning for the determination of the extension setting, damping etc. for the rotary projection 10.

The data of the location detecting system 11 are stored and processed in an appropriately programmed management and control computer R and later used to control the rotary projection 10 (cf. below).

The rotary projection 10 is disposed approximately centrally in the conveying direction F in the second conveying section 3 which is a driven roller conveyor.

Figures 1, 2:
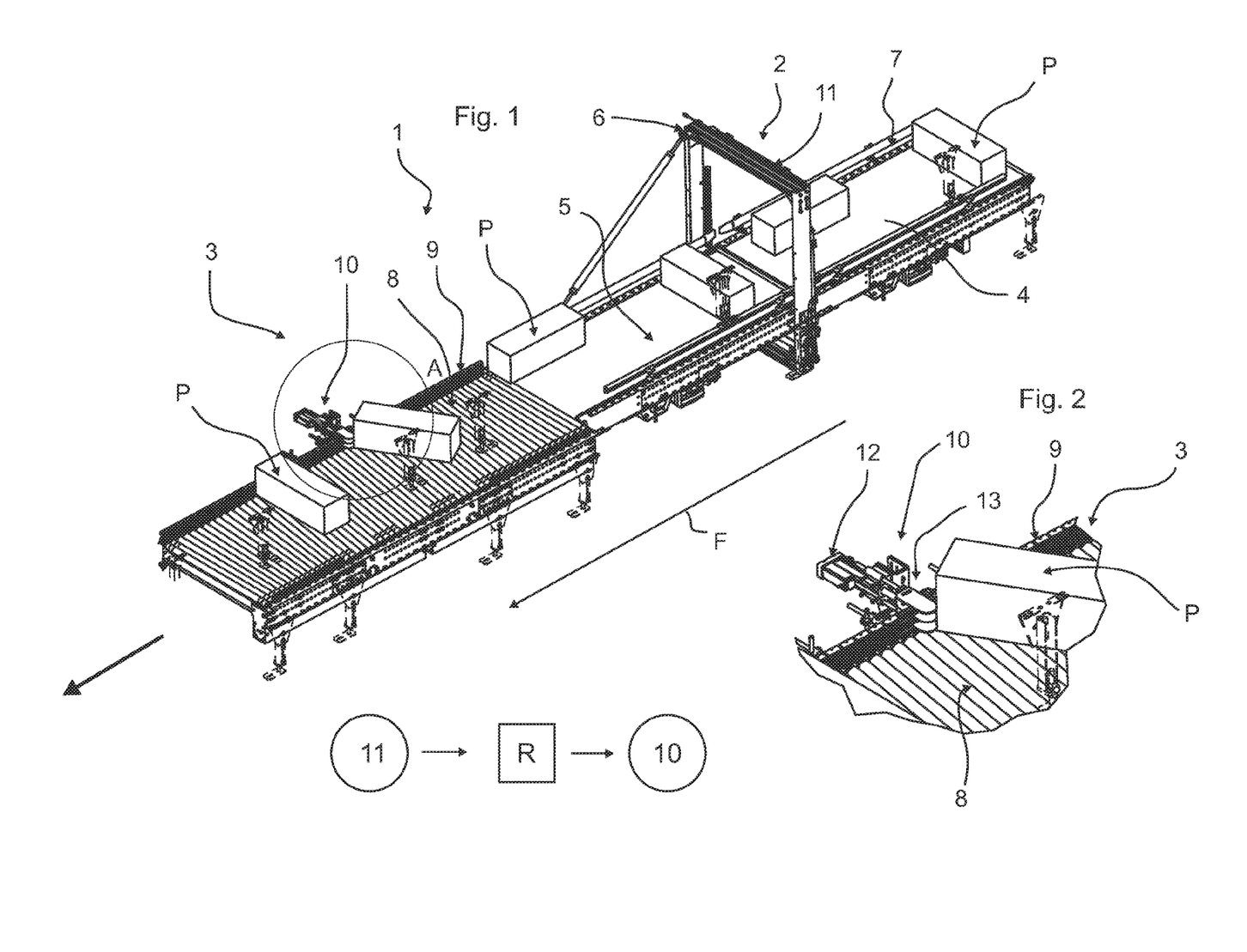
FIG. 1 is a schematic perspective view of a device in accordance with the invention in a supply section to an automatic palletising device.
FIG. 2 is an enlarged section of the region A of FIG. 1.
Figure 3:
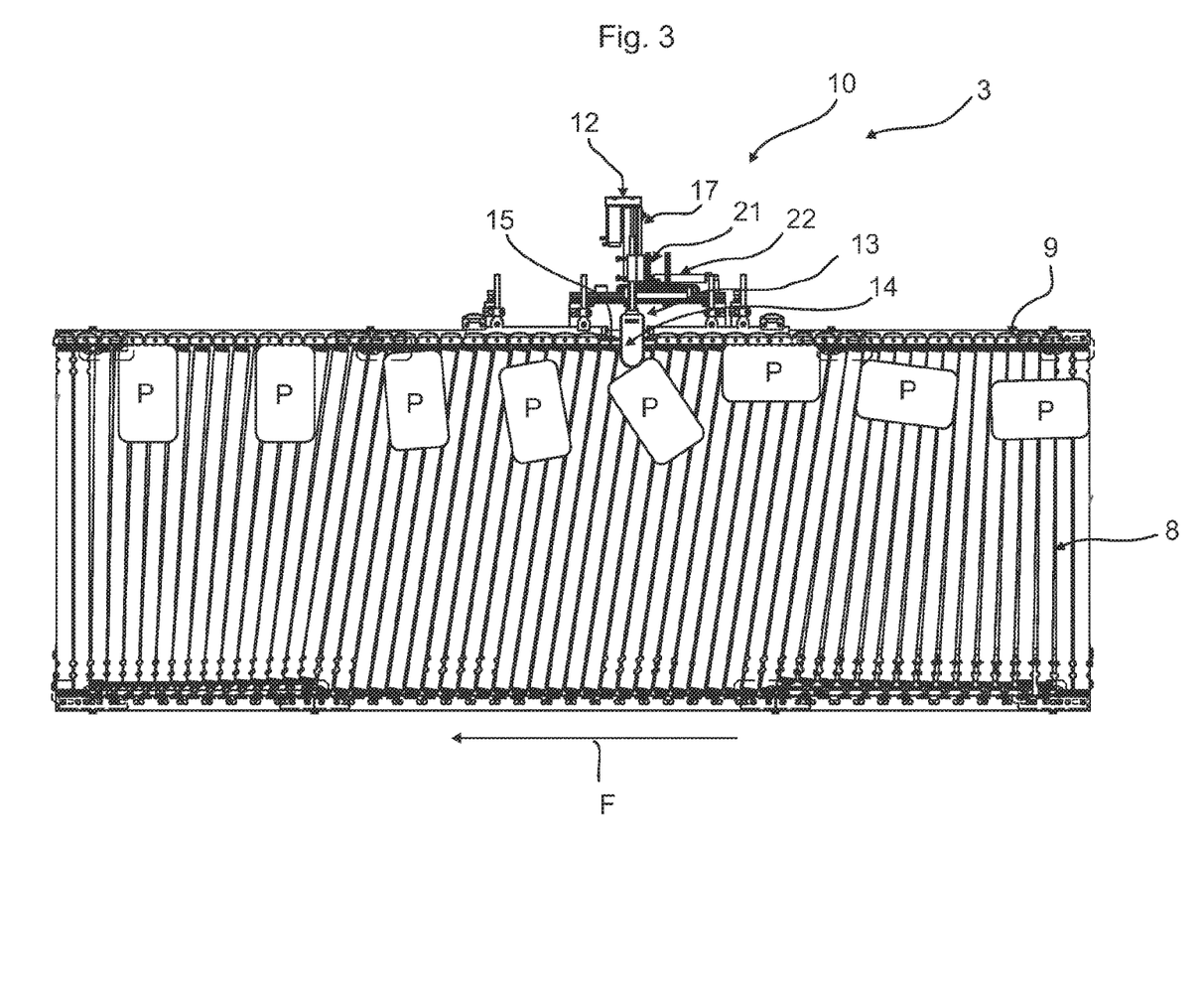
FIG. 3 is a schematic plan view of the region around the rotary projection from FIG. 1 during changing of the orientation of articles.
Figure 4:
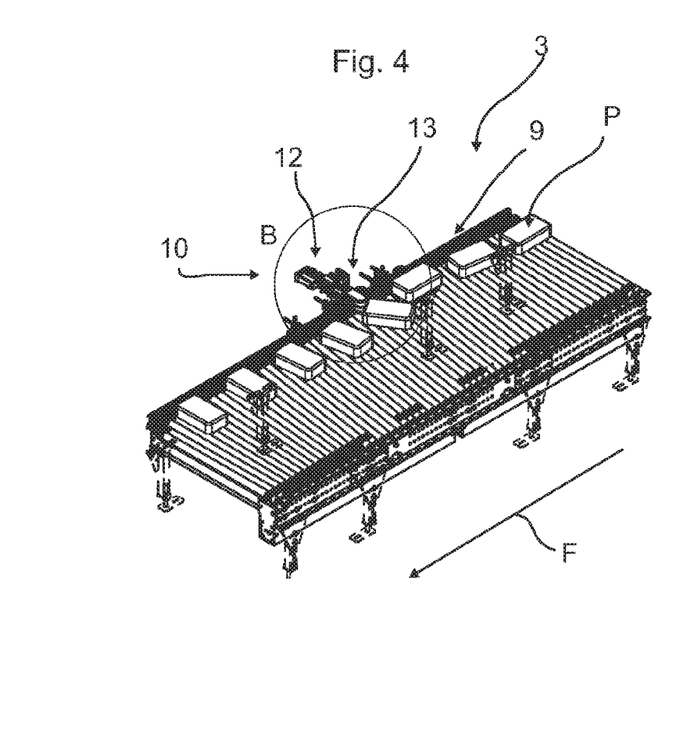
FIG. 4 is a schematic perspective view of FIG. 3.

The roller conveyor 3 has side roller tracks 9 and the rollers 8 are skewed at an increasing angle going towards the rotary projection 10 and are skewed at a decreasing angle going away from the rotary projection 10 with respect to the normal conveying direction F (cf. FIG. 3).

The rotary projection 10 itself is designed to be able to retract and extend linearly in the conveying path, transversely with respect to the conveying direction F, wherein its extension into the conveying flow is variable, i.e. is adjusted in dependence upon the individual articles in order to achieve the desired change in orientation (or no change).

The rotary projection 10 comprises a frame part 12 and a head 13 constructed in a comb-like manner from three flexible damping blades 14 which are spaced apart one above the other and with respect to each other and are rounded at the tip.

The three blades 14 of the comb make it possible for the rotary projection 10 to retract and extend through slits 15 in the side roller track 9 of the roller conveyor 8 and for the side wall to be provided with only small openings (namely the slits 15) so that articles P do not get stuck on the side wall, in particular if they are small, since no larger openings or interruptions are necessary.

It can thus also be ensured that the roller track 9 still retains its guiding function and comprises no gaps when the rotary projection 10 is in the retracted position.

In the present case, two slits 15 are sufficient since the third, uppermost blade 14 protrudes beyond the roller track 15.

The flexible damping blades 14 make possible gentle handling of the articles P. For this purpose their tips are rounded and provided with a latex coating increasing the frictional coefficient.

The blades 14 are held by a vertical plate 16 which in turn is centrally driven by an electrically displaceable cylinder 17. The electrically displaceable cylinder 17 has a path controller so that its extension path can be adjusted precisely.

Above and below the electrically displaceable cylinder 17, additional round bar guides 18 are provided which run in bushings 19 and are likewise fixed to the vertical plate 16 in order to ensure stable guidance of the head 13 of the rotary projection.

The bushings 19 are formed by a holding plate 20 on which the electrically displaceable cylinder 17 is also flange-mounted and which is in turn supported by a holder 21.

The holder 21 is laterally fastened to the outside of the conveying path 3 by way of a damping arrangement 22.

The damping arrangement 22 comprises shock absorbers 23 extending horizontally in the conveying direction and permitting damped flexibility for the rotary projection 10 in the conveying direction F so that its carriage-like arrangement is produced.

The slits 15 are of an appropriate width to take account of the damping path.

The function of the supply section 1 is explained hereinunder.

Articles P pass through the measuring bridge 6 in the first conveying path 2 and at that point are detected by the location detection system 11 with respect to their orientation. At the same time a check is carried out as to whether the measured article P is actually the article expected (by the location management controller). If it is not, the article can be removed from the conveying flow.

The results of the measurement are checked in the computer R as to whether a change in orientation is required. If the article P is already correctly orientated, it can pass through the second conveying section 3 without being acted upon by the rotary projection 10 and this rotary projection is completely retracted for this purpose (cf. FIG. 7).

Figures 6, 7, 8:
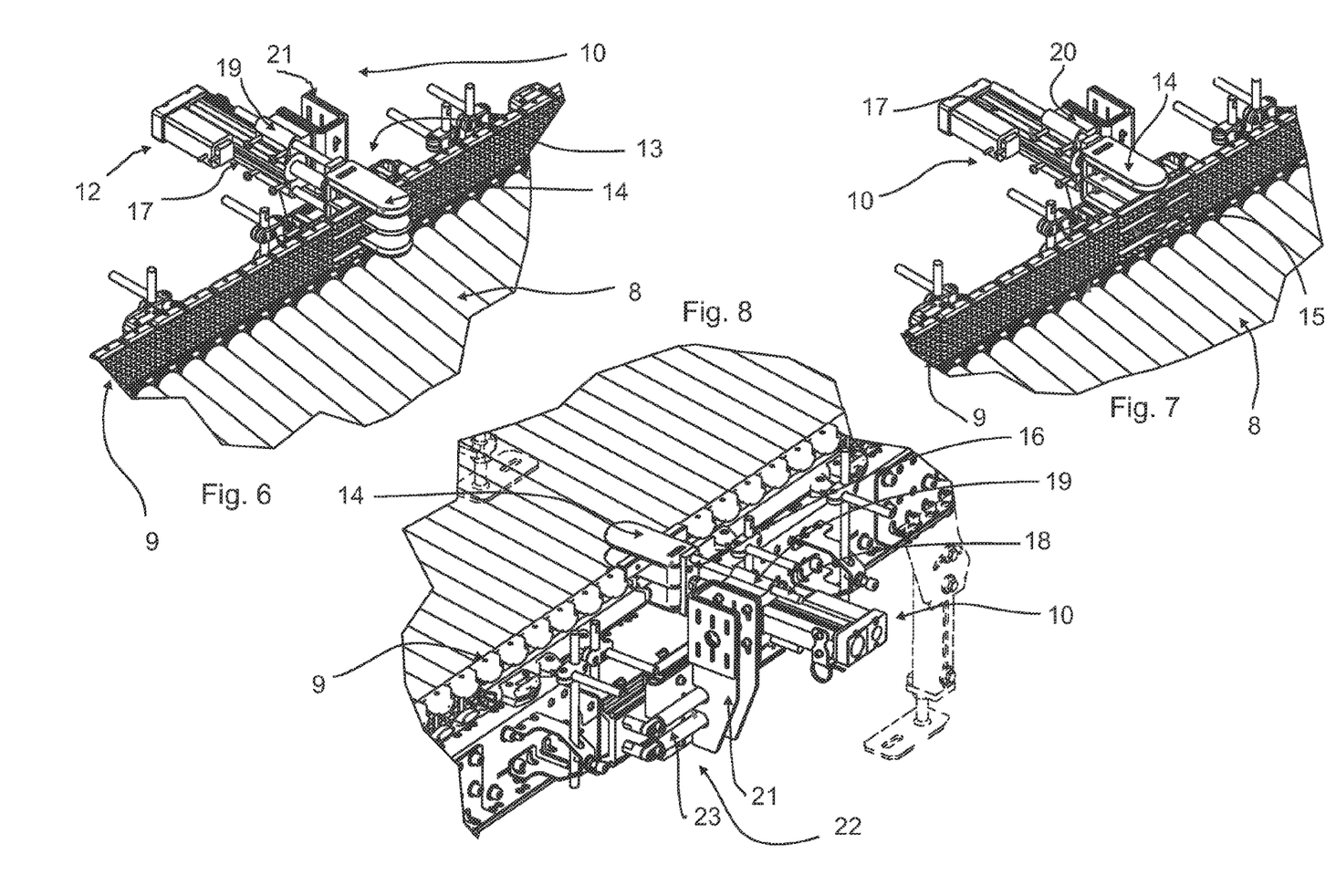
FIG. 6 is an enlarged section of the region B of FIG. 4 without articles and with the rotary projection in an extension position.
FIG. 7 is an enlarged section of the region B of FIG. 4 without articles and with the rotary projection in the retracted position.
FIG. 8 is a view corresponding to FIG. 6 from a different perspective (from behind)

If the article P is not yet orientated as desired, it will pass through the second conveying section 3 while being acted upon by the rotary projection 10 and this rotary projection is extended for this purpose (cf. FIG. 6).

The computer R thus controls the electrically displaceable cylinder 17 with the aid of the criteria stored for the respective article so that this cylinder extends the head 13 of the rotary projection 10 through the slits 15 in the roller track 9, in particular with a specific extension (extension stroke) for each article to be changed.

Figure 5:
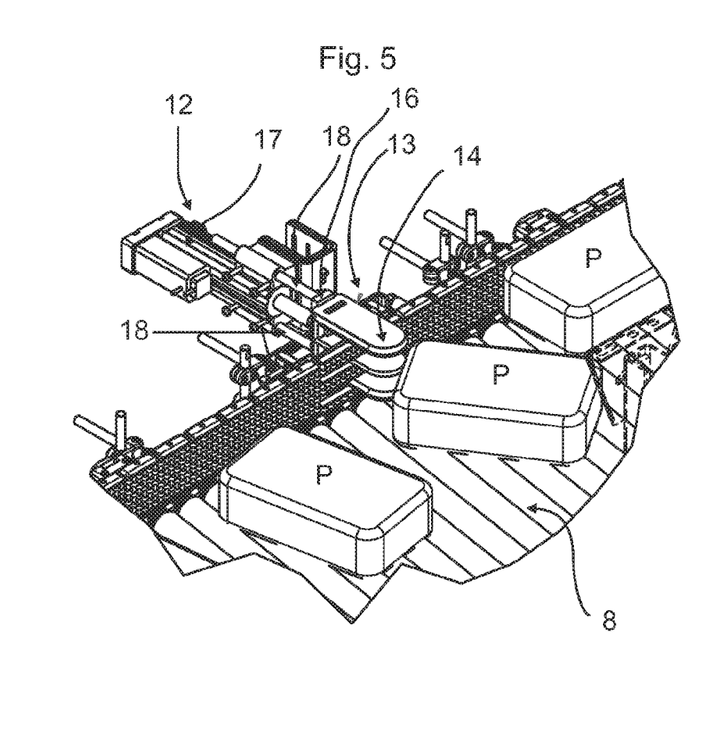
FIG. 5 is an enlarged section of the region B of FIG. 4.

The respective article P is gently conveyed towards this roller track 9 by the skewed rollers 8 (cf. FIG. 3) and then contacts the blades 14 of the rotary projection, or the rounded tips thereof, which are protruding into the conveying path (cf. FIGS. 3 and 5).

By means of the conveying force acting on the articles P during contact with the rotary projection 10 they are rotated by 90 degrees and thus virtually roll off on the rounded tips of the blades 14 (cf. FIG. 5). In so doing, the articles are moved away from the side roller track 9 but are conveyed again towards the roller track 9 by the skewed rollers 8.

Thus the articles P leave the second conveying section 3 in the desired orientation lying on the roller track 9.

However, the second conveying section 3 can be used not only to change the orientation of the articles P but also to separate them.

If it is determined in the measuring bridge 6 and by the location detecting system 11 at that point that two articles P are being conveyed next to one another (cf. FIGS. 9 and 10) it may be necessary to separate them in order to ensure later automatic handling of the individual articles P.

Figures 9, 10:
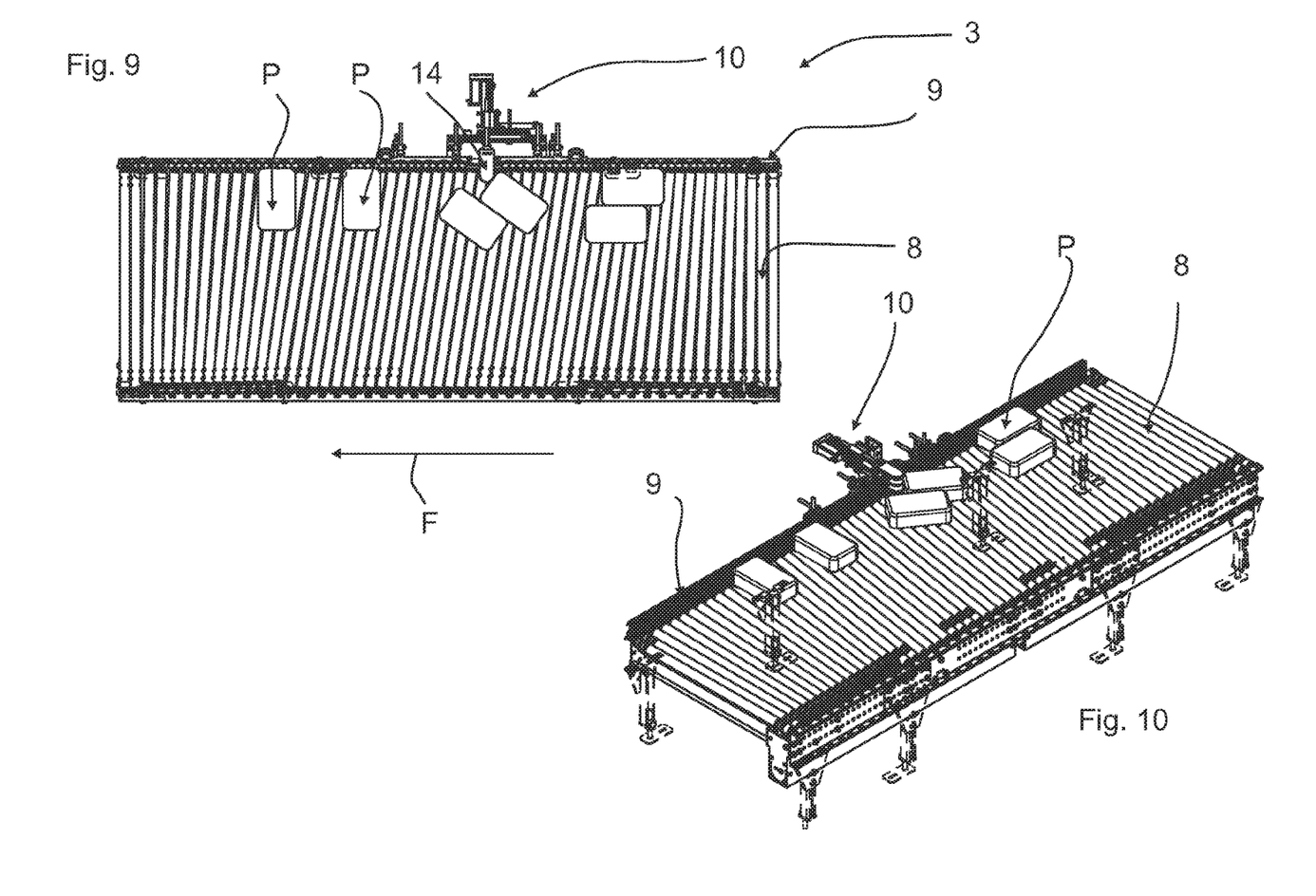
FIG. 9 is a view corresponding to FIG. 3 during separation of articles.
FIG. 10 is a perspective view of FIG. 9.

Then the rotary projection 10 can be extended in such a way that it contacts the article P on the right in the conveying direction F and during the rotation thus initiated (cf. above) brakes it so that the second article is conveyed further more quickly or while being influenced to a lesser degree and the articles P are therefore separated.

The invention claimed is:

1. A method for changing the orientation of articles in a conveying flow, said method comprising protruding a rotary projection into the conveying path of a conveyor of a material handling installation with the orientation of the articles being achieved by the force of the conveying flow and the conveying flow runs in a skewed manner upstream of the rotary projection in the direction thereof in order to ensure that the articles contact the rotary projection, wherein the rotary projection is designed to be movable transversely with respect to the conveying path in such a way that its extension into the conveying flow is variable, and including determining article data of each article wherein the length of the extension of the rotary projection into the conveying flow is set according to the respective article data in order to achieve any desired change in orientation of the article.

2. The method as claimed in claim 1, wherein the orientation of the articles is determined in an upstream measuring section.

3. The method as claimed in claim 1, wherein the rotary projection can be completely retracted if an article does not have to be orientated.

4. A method for changing the orientation of articles in a conveying flow, said method comprising protruding a rotary projection into the conveying path of a conveyor of a material handling installation with the orientation of the articles being achieved by the force of the conveying flow and the conveying flow runs in a skewed manner upstream of the rotary projection in the direction thereof in order to ensure that the articles contact the rotary projection, wherein the rotary projection is designed to be movable transversely with respect to the conveying path in such a way that its extension into the conveying flow is variable, and wherein the length of the extension of the rotary projection into the conveying flow is set according to the respective article, wherein the degree of the skewed conveying flow increases going towards the rotary projection and then decreases.

5. The method as claimed in claim 4, wherein the orientation of the articles is determined in an upstream measuring section.

6. A device for changing the orientation of articles on a conveyor comprising a roller conveyor, said device comprising a rotary projection protruding into a conveying path of a roller conveyor of a material handling installation, wherein the rotary projection changes the orientation of the articles by the force of the conveying flow of the articles upon contact with the rotary projection, wherein the conveyor conveys articles upstream of the rotary projection in a skewed manner in the direction thereof in order to ensure that the articles contact the rotary projection, including determining article data of each article wherein the rotary projection is designed to be movable transversely with respect to the conveying path in such a way that its extension into the conveying flow can be controlled in a variable manner according to the respective article data in order to achieve any desired change in orientation of the article.

7. The device as claimed in claim 6, further including an actuator, and wherein the rotary projection is configured to be displaced by the actuator in a continuously variable manner between a position extended out of the conveying path and a position retracted into the conveying path.

8. The device as claimed in claim 6, wherein upstream of the rotary projection a measuring section with a detection apparatus for recognizing the orientation and dimensions of the articles is disposed.

9. A device for changing the orientation of articles on a conveyor comprising a roller conveyor, said device comprising a rotary projection protruding into a conveying path of a roller conveyor of a material handling installation, wherein the rotary projection changes the orientation of the articles by the force of the conveying flow of the articles upon contact with the rotary projection, wherein the conveyor conveys articles upstream of the rotary projection in a skewed manner in the direction thereof in order to ensure that the articles contact the rotary projection, wherein the rotary projection is designed to be movable transversely with respect to the conveying path in such a way that its extension into the conveying flow can be controlled in a variable manner according to the respective article, wherein the rotary projection comprises at least two flexible damping blades which are rounded at the tip and are spaced apart one above the other and with respect to each other.

10. The device as claimed in claim 9, wherein the rotary projection is configured in the manner of a comb.

11. A method for changing the orientation of articles in a conveying flow, said method comprising protruding a rotary projection into the conveying path of a roller conveyor of a material handling installation with the orientation of the articles being achieved by the force of the conveying flow and the conveying flow runs in a skewed manner upstream of the rotary projection in the direction thereof in order to ensure that the articles contact the rotary projection, wherein the rotary projection is designed to be movable transversely with respect to the conveying path in such a way that its extension into the conveying flow is variable, and wherein the length of the extension of the rotary projection into the conveying flow is set according to the respective article, wherein rollers of the roller conveyor are skewed at an increasing angle going towards the rotary projection and are skewed at a constant or decreasing angle going away from the rotary projection with respect to the normal conveying direction.

12. The method as claimed in claim 11, wherein upstream of the rotary projection a measuring section with a detection apparatus for recognizing the orientation and dimensions of the articles is disposed.

13. A method for changing the orientation of articles in a conveying flow, said method comprising protruding a rotary projection into the conveying path of a conveyor of a material handling installation with the orientation of the articles being achieved by the force of the conveying flow and the conveying flow runs in a skewed manner upstream of the rotary projection in the direction thereof in order to ensure that the articles contact the rotary projection, wherein the rotary projection is designed to be movable transversely with respect to the conveying path in such a way that its extension into the conveying flow is variable, and wherein the length of the extension of the rotary projection into the conveying flow is set according to the respective article, wherein the rotary projection comprises at least two flexible damping blades that are spaced apart one above the other and with respect to each other.

14. The method as claimed in claim 13, wherein an actuator is coupled with said rotary projection, and wherein the rotary projection is configured to be displaced by the actuator in a continuously variable manner between a position extended out of the conveying path and a position retracted into the conveying path.

15. The method as claimed in claim 13, wherein upstream of the rotary projection a measuring section with a detection apparatus for recognizing the orientation and dimensions of the articles is disposed.

16. The method as claimed in claim 15, wherein an actuator is coupled with said rotary projection, and wherein the rotary projection is configured to be displaced by the actuator in a continuously variable manner between a position extended out of the conveying path and a position retracted into the conveying path.

17. A conveyor system for changing the orientation of articles on a conveyor, said conveyor system comprising:
a roller conveyor section having a plurality of rollers;
a rotary projection configured to extend into a conveying path of the roller conveyor section;
wherein the rotary projection is movable transversely with respect to a conveying path of the roller conveyor section, and wherein articles conveyed on the roller conveyor section are conveyed into the rotary projection to contact the rotary projection with the force of each article contacting the rotary projection to change the orientation of the respective article, and including determining article data of each article with the extension of the rotary projection into the conveying path being controlled in a variable manner based on each respective article data in order to achieve any desired change in orientation of the article.

18. The conveyor system of claim 17, further including an actuator and wherein the rotary projection comprises at least two flexible damping blades that are spaced apart one above the other and with respect to each other, and wherein the rotary projection is configured to be displaced by the actuator in a continuously variable manner between a position extended out of the conveying path and a position retracted into the conveying path.

19. A conveyor system for changing the orientation of articles on a conveyor, said conveyor system comprising:
a roller conveyor section having a plurality of rollers;
a rotary projection configured to extend into a conveying path of the roller conveyor section;
wherein the rotary projection is movable transversely with respect to a conveying path of the roller conveyor section, and wherein articles conveyed on the roller conveyor section are conveyed into the rotary projection to contact the rotary projection with the force of each article contacting the rotary projection to change the orientation of the respective article, and with the extension of the rotary projection into the conveying path being controlled in a variable manner based on each respective article, wherein rollers of the roller conveyor are skewed at an increasing angle going towards the rotary projection and are skewed at a constant or decreasing angle going away from the rotary projection with respect to a normal conveying direction.

20. The conveyor system of claim 19, wherein upstream of the roller conveyor section a measuring section with a detection apparatus for recognizing the orientation and dimensions of the articles is disposed, and wherein the extension of the rotary projection into the conveying path is controlled based on a detection of the orientation and dimensions for each respective article.

* * * * *